US 7,058,016 B1

(12) United States Patent
Harper

(10) Patent No.: US 7,058,016 B1
(45) Date of Patent: Jun. 6, 2006

(54) METHOD AND SYSTEM FOR ACCELERATING ROUTE CALCULATION IN LINK STATE ROUTING PROTOCOLS

(75) Inventor: John Harper, London (GB)

(73) Assignee: Cisco Technology, Inc., San Jose, CA (US)

(*) Notice: Subject to any disclaimer, the term of this patent is extended or adjusted under 35 U.S.C. 154(b) by 683 days.

(21) Appl. No.: 09/687,009

(22) Filed: Oct. 12, 2000

(51) Int. Cl.
*G01R 31/08* (2006.01)
(52) U.S. Cl. .................. 370/238; 370/254; 370/395.32
(58) Field of Classification Search ........... 370/401, 370/428, 429, 395.3, 395.31, 395.32, 392, 370/412, 238, 252, 254, 220; 709/239, 240–242, 709/238
See application file for complete search history.

(56) References Cited

U.S. PATENT DOCUMENTS

| | | | |
|---|---|---|---|
| 5,128,926 A * | 7/1992 | Perlman et al. ............ 370/248 |
| 5,251,205 A | 10/1993 | Callon et al. ................. 370/60 |
| 5,265,092 A * | 11/1993 | Soloway et al. ............ 370/238 |
| 5,430,727 A * | 7/1995 | Callon ......................... 370/401 |
| 5,649,108 A * | 7/1997 | Spiegel et al. .............. 709/241 |
| 5,838,660 A * | 11/1998 | Croslin ....................... 370/216 |
| 5,854,899 A * | 12/1998 | Callon et al. ............... 709/238 |
| 5,920,697 A * | 7/1999 | Masters et al. ............. 709/219 |
| 6,098,107 A * | 8/2000 | Narvaez-Guarnieri et al. ... 709/239 |
| 6,252,856 B1 * | 6/2001 | Zhang ......................... 370/254 |
| 6,301,244 B1 * | 10/2001 | Huang et al. ................ 370/351 |
| 6,418,139 B1 * | 7/2002 | Akhtar ........................ 370/356 |
| 6,456,599 B1 * | 9/2002 | Elliott ......................... 370/254 |
| 6,483,833 B1 * | 11/2002 | Jagannath et al. .......... 370/392 |
| 6,490,246 B1 * | 12/2002 | Fukushima et al. ......... 370/220 |
| 6,639,897 B1 * | 10/2003 | Shiomoto et al. ........... 370/238 |
| 6,643,269 B1 * | 11/2003 | Fan et al. .................... 370/254 |
| 6,646,989 B1 * | 11/2003 | Khotimsky et al. ......... 370/238 |
| 6,724,722 B1 * | 4/2004 | Wang et al. ................. 370/229 |
| 2003/0165117 A1 * | 9/2003 | Garcia-Luna-Aceves et al. 370/238 |

OTHER PUBLICATIONS

RFC 1195 "Use of OSI IS-IS for Routing in TCP/IP and Dual Environments" Digital Equipment Corporation, Dec. 1990.
RFC 1583 "OSPF Version 2" Proteon, Inc., Mar. 1994.
Narvaez, Paolo, "Routing Reconfiguration in IP Networks" Jun. 2000 MIT.

* cited by examiner

*Primary Examiner*—Chau Nguyen
*Assistant Examiner*—Ian N. Moore
(74) *Attorney, Agent, or Firm*—Cindy Kaplan

(57) ABSTRACT

A method for performing route calculations in a link state routing protocol at a node within a computer network. The method includes evaluating existing routes of the node when new route information is received and recalculating routes for the node only when the new route information improves at least one of the existing routes or at least one of the existing routes is made worse or lost. A system for performing route calculations is also disclosed.

32 Claims, 9 Drawing Sheets

METHOD AND SYSTEM FOR ACCELERATING ROUTE CALCULATION IN LINK STATE ROUTING PROTOCOLS

BACKGROUND OF THE INVENTION

The present invention relates generally to routing communications within a computer network, and more specifically, to link state routing protocols.

Communication in a computer network involves the exchange of data between two or more entities interconnected by communication links and subnetworks. Entities concerned primarily with the correct routing of information in the network are called routers, to distinguish them from end systems which process traffic but do not take part in routing it. There are two fundamentally different approaches to the distribution and use of routing information in a network, called Distance Vector Routing and Link State Routing. In the former, each router tells its immediate neighbors how it would reach each entity in the network, updating this as similar information is received from its neighbors. In the latter, each router arranges to send information about its own connectivity to its neighbors to all routers in the network. Each router then runs an algorithm called Shortest Path First (SPF) to find the best route from itself to each entity in the network. Early routing protocols (e.g. RIP) used the Distance Vector approach. Link State Routing protocols first appeared in the early 1980s, and became widely used in the Internet during the 1990s. OSPF (Open Shortest Path First) and Integrated IS—IS (Intermediate System—Intermediate System) are widely used examples of such protocols. Although there are many detailed differences between them, the fundamental algorithms are the same for both of them. OSPF is a routing protocol developed for IP (Internet Protocol). IS—IS was originally designed for Open Systems Interconnection (OSI) protocols, and was subsequently extended to deal with IP.

With link state routing, each router must discover its neighbors and learn their network addresses. A cost (typically related to the link bandwidth) is associated, generally by network management, with each link. One or more link state packets are then constructed containing this information, and flooded to all routers in the network. Dijkstra's Shortest Path First algorithm is then used at each router to find the shortest path to every other router. This algorithm maintains a set of nodes whose shortest path is already known and operates by adding one node to this known set with each iteration. The next step is to the next closest router along this path, always choosing the one which has the lowest cost from the local node. This process continues until all reachable nodes are in the known set with costs assigned to each.

Link state protocols offer several advantages over alternatives such as distance vector protocols, but have at least one significant drawback. With conventional link state protocols, every time a link changes state (e.g., up, down, or change in administrative cost) anywhere in the network, each node must recalculate all of the routes from scratch by running the Dijkstra algorithm. This is fine for small networks, but route recalculation in large networks may take hundreds of milliseconds. This limits the speed with which the network can react to changes and places a heavy burden on the route processor in a router. In an attempt to reduce the number of times route recalculations are performed, hold-down timers are sometimes used, which limit the frequency with which the SPF algorithm is run. However, this results in networks that are relatively slow to react to changes.

There is, therefore, a need for a method and system for reducing the amount of route recalculations required without increasing the time it takes for a network to react to topology changes.

SUMMARY OF THE INVENTION

A method and system for accelerating route calculations in link state routing protocols are disclosed.

A method for performing route calculations in a link state routing protocol at a node within a computer network generally comprises evaluating existing routes of the node when new route information is received and recalculating routes for the node only when the new route information improves at least one of the existing routes or at least one of the existing routes is made worse or lost.

In another aspect of the invention, a method of updating a tree structure of a root node in a computer network of interconnected nodes after a change in the network's topology comprises receiving new route information at the root node and applying an incremental Dijkstra algorithm to the root node only if the new route information improves or worsens existing routes of the node or one of the existing routes of the nodes are lost.

A computer program product of the present invention generally comprises code that evaluates existing routes of the node when new route information is received and code that recalculates routes for the node only when the new route information improves at least one of the existing routes or at least one of the existing routes is made worse or lost. The product further comprises a computer-readable storage medium for storing the codes.

A system of the present invention generally comprises a processor operable to evaluate existing routes of the node when new route information is received and recalculate routes for the node only when the new route information improves at least one of the existing routes or at least one of the existing routes is made worse or lost. The system further includes memory for storing route information.

In another aspect of the invention, a system for performing route calculations in a link state routing protocol at a node within a computer network generally comprises means for evaluating existing routes of the node when new route information is received. The system further includes means for recalculating routes for said node only when the new route information improves at least one of the existing routes or at least one of the existing routes is made worse or lost. The system also includes memory for storing route information.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
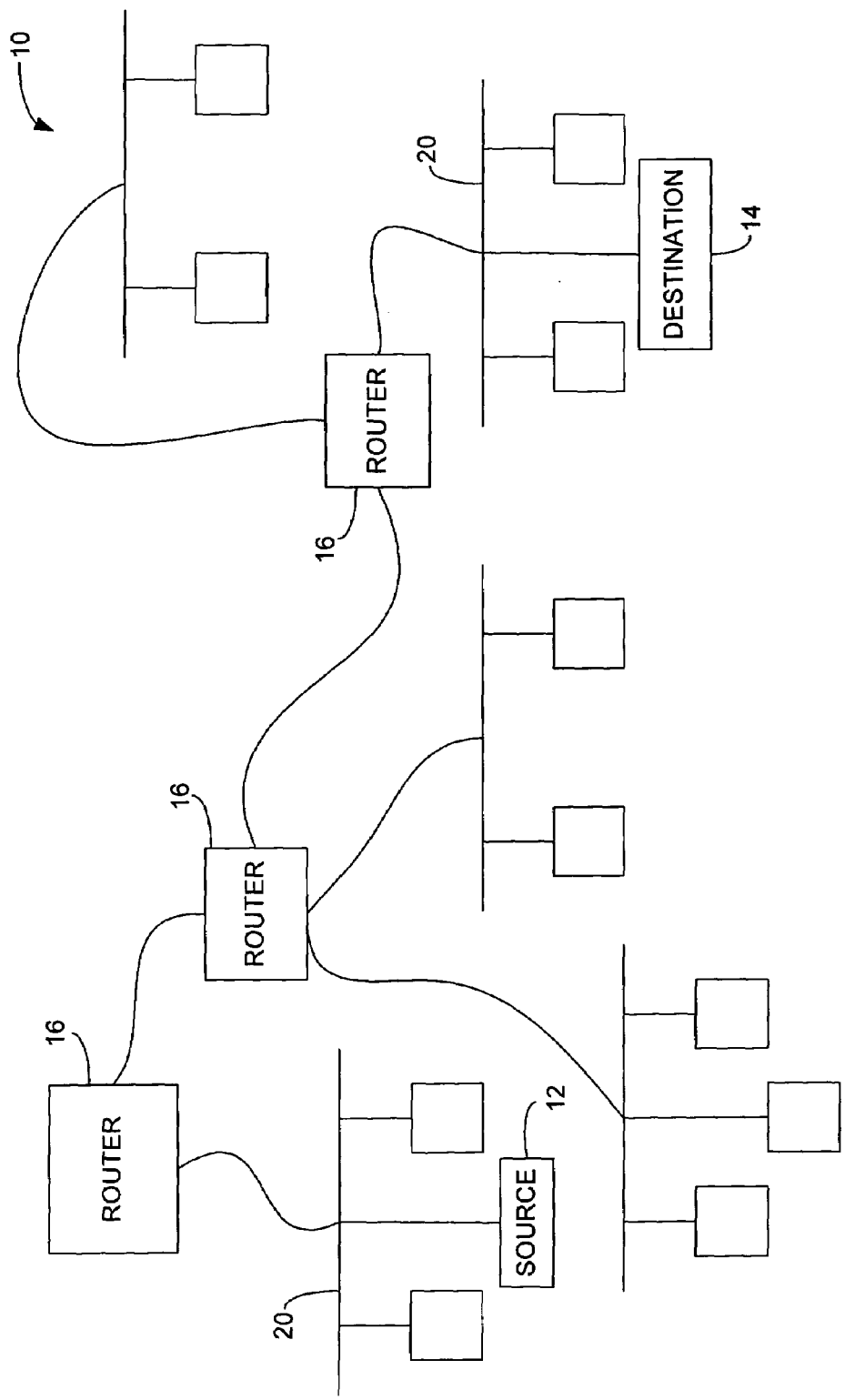
FIG. 1 is a diagram of a network system comprising a plurality of computer networks.

The present invention operates in the context of a data communication network including multiple network elements. FIG. 1 is a block diagram of a network system, generally indicated at 10, comprising a collection of computer networks having a plurality of stations. The stations are typically computers comprising source station 12, destination station 14, and intermediate stations 16. Some of the nodes in a network that employs the present invention may be network devices such as routers and switches. For example, some of the nodes 16 may be suitably configured routers such as those available from Cisco Systems, Inc. of San Jose, Calif. As used herein the term router is used to refer to devices that forward packets based on network and higher layer information. The router 16 may include, for example, a master central processing unit (CPU), interfaces, and a bus. The CPU preferably includes memory and a processor. When acting under the control of appropriate software or firmware, the CPU is responsible for such router tasks as routing table computations, network management, and general processing of packets. It preferably accomplishes all these functions under the control of software including an operating system (e.g., a version of the Internetwork Operating System (IOS®) of Cisco Systems, Inc.) and any appropriate applications software. The CPU may include one or more processors such as a processor from the Motorola family or microprocessors of the MIPS family of microprocessors. In an alternative embodiment, the processor is specially designed hardware for controlling the operations of the router. Memory can be non-volatile RAM and/or ROM. However, there are many different ways in which memory could be coupled to the system. In an alternative embodiment, a router or switch may be implemented on a general purpose network host machine such as the computer system of FIG. 2.

Figure 2:
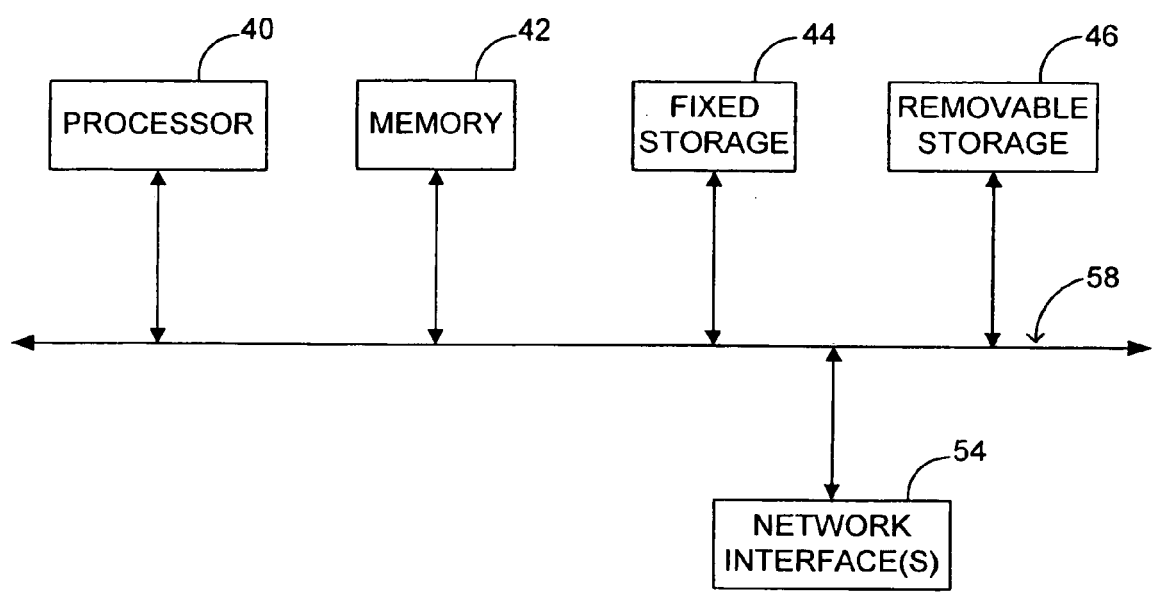
FIG. 2 is a diagram illustrating an example of a computer system that can be utilized to execute software of an embodiment of the present invention.

FIG. 2 shows a system block diagram of computer system that may be used to execute software of an embodiment of the invention. The computer system may include subsystems such as a central processor 40, system memory 42, removable storage 46 (e.g., CD-ROM drive), and a hard drive 44 which can be utilized to store and retrieve software programs incorporating computer code that implements aspects of the invention, data for use with the invention, and the like. The computer readable storage may also include flash memory, or system memory. Additionally, a data signal embodied in a carrier wave (e.g., in a network including the Internet) may be the computer readable storage medium. Other computer systems suitable for use with the invention may include additional or fewer subsystems. For example, the computer system may include more than one processor 40 (i.e., a multi-processor system) or a cache memory.

The system bus architecture of the computer system is represented by arrows 58 in FIG. 2. However, these arrows are only illustrative of one possible interconnection scheme serving to link the subsystems. For example, a local bus may be utilized to connect the central processor 40 to the system memory 42. The components shown and described herein are those typically found in most general and special purpose computers and are intended to be representative of this broad category of data processors. The computer system shown in FIG. 2 is only one example of a computer system suitable for use with the invention. Other computer architectures having different configurations of subsystems may also be utilized.

Communication between computers within the network is made possible with the use of communication protocols, which govern how computers exchange information over a network. The computer may include an input/output circuit used to communicate information in appropriately structured form to and from parts of the computer and associated equipment. Preferably, each of these interfaces includes a plurality of ports appropriate for communication with the appropriate media, and associated logic, and in some instances memory. The associated logic may control such communication intensive tasks as packet integrity checking and media control and management. The high speed interfaces are preferably multiport Ethernet interfaces, but may be other appropriate interfaces such as FDDI interfaces.

The routers 16 facilitate the flow of data packets throughout the system by routing the packets to the proper receiving stations. The packet typically contains the address of the final destination station 14. The final destination address remains constant as the packet traverses the networks. A key function of router 16 is determining the next station to which the packet is sent. The routers 16 typically execute routing algorithms to decide over which communication links incoming packets should be transmitted. A type of network layer routing protocol commonly employed by routers is a link state routing protocol. With link state routing, each router must discover its neighbors and learn their network addresses, measure the delay to each of its neighbors, construct a packet containing this information, send the packet to all other routers, and compute the shortest path to every other router.

When router 16 is booted, its first task is to learn who its neighbors are. It accomplishes this goal by sending a special HELLO packet on each point-to-point line. The router 16 on the other end is expected to send back a reply telling who it is. Once the information needed for the exchange has been collected, the next step is for each router to build a packet containing all of this data. The packet (a Link State Packet) starts with the identity of the sender, followed by a sequence number, age, and a list of neighbors. For each neighbor, the cost to that neighbor, a network management parameter, is given. The link state database is synchronized by having the routers exchange LSPs to build the link state database. The routers flood the networks with LSPs, check integrity using a checksum, and resend the LSPs by forwarding them out on all enabled interfaces except the interface on which each was received or on which the same LSP has already been received. The router's link state database is thus a combination of the router's own adjacency database and the LSP packets arriving from all other routers. When the link state database is complete in conventional systems, a copy of the database, which includes a map of the network and its links, services, and external routes for the area, is maintained in each router.

Once a router has accumulated a full set of link state packets, it can construct the entire subnet graph since every link is now represented. Dijkstra's algorithm is then run locally to construct the shortest path to all reachable destinations. The output of the Dijkstra algorithm is the next hop (i.e., intermediate router) to the destination. The results of this algorithm is installed in the routing tables.

In conventional link state algorithms, every time a link changes state anywhere in the network, each node must recalculate all of the routes from scratch by running the Dijkstra algorithm. Most of the time this is a lot of unnecessary work. Each node in the network builds a spanning tree which encompasses each other node in the network. A Spanning Tree is a graphical construction in which each node (router in the present instance) is reachable over a unique sequence of links. The majority of the links will not figure in any given spanning tree, since the number of links in use is one less than the total number of nodes, whereas the number of links in the network is typically many times this. Furthermore, most of the links which are in use will be near leaves of the spanning tree (i.e. distant from the root), and will affect only a small number of nodes.

As described below, the method and system of the present invention utilizes an incremental Dijkstra algorithm. Whereas the conventional Dijkstra algorithm always computes the entire spanning tree, the incremental Dijkstra algorithm can incorporate changes to the information about individual links in an optimized way, without examining every node. Nodes with new route information (Link State Packets) are sorted into order of cost from the current node (the root). Each change in state is then evaluated. If it has no effect on existing routes it is ignored. If it improves existing routes, the routes are re-evaluated starting from the changed node. If existing routes are lost or made worse, the entire subtree from the affected link is re-evaluated. Each node is reattached at the best (lowest cost) point in the remaining spanning tree, if possible, and routes re-evaluated starting from the nodes that have been reattached. The effect is equivalent to running the full Dijkstra algorithm, at a much lower computation cost.

Figure 9:
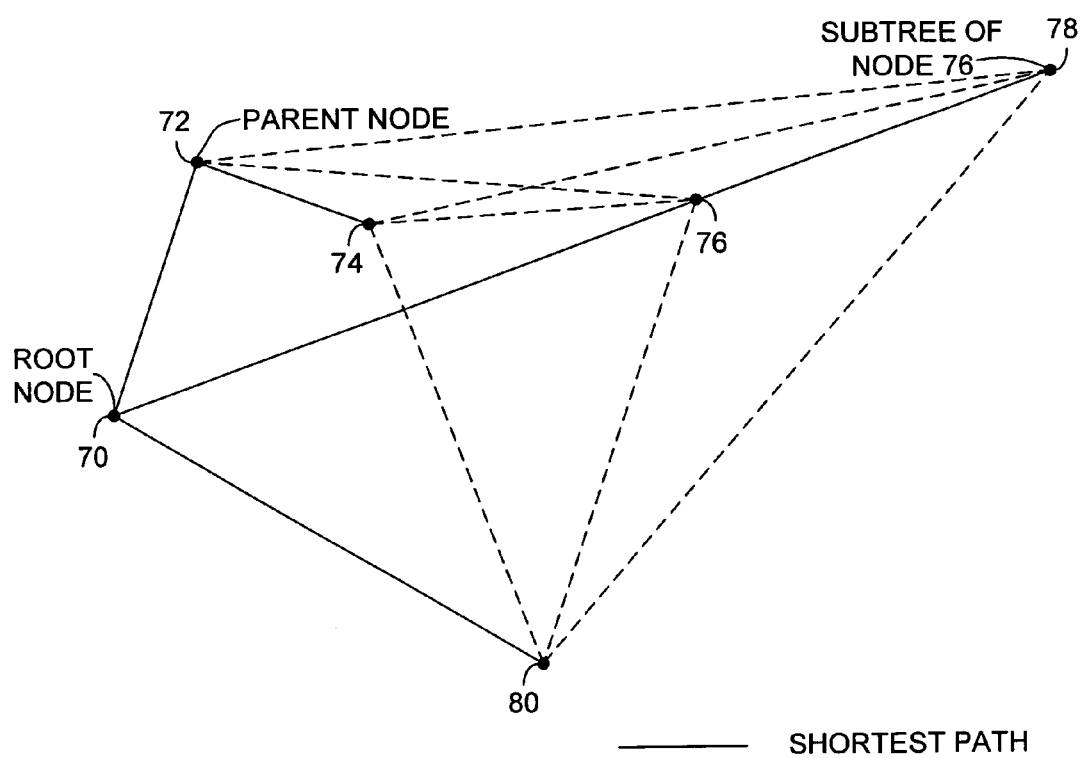
FIG. 9 is a diagram illustrating nodes of a network and links connecting the nodes.

In the following description the global variable root is the identity of the node which is at the root of the spanning tree (i.e., normally the node which is running the algorithm). CurrentNode is used throughout the description to represent the node currently being worked on, while neighbor is used as the neighbor currently being considered. FIG. 9 illustrates an example of a network having six nodes 70, 72, 74, 76, 78, 80. Node 70 is identified as the root node. Its neighbor nodes are nodes 72, 76, and 80. Similarly, node 74 has neighbor nodes 72, 76, 78, and 80. Root node 70 can reach node 74 by passing through node 72, node 80, node 76, or nodes 78 and 72, 76, or 80. As indicated by solid lines, the path through node 72 is the shortest path from node 70 to node 74. Since traffic to node 74 has to pass through node 72 to get from the root node 70, node 72 is referred to as its parent node.

The subtree of a node is the set of nodes which are reached from the root by passing through that node. For example, the subtree of node 76 in FIG. 9 consists of node 78. In a larger and more realistic network, there will be nodes whose subtrees are large. A node which has no subtree (i.e., which is on the path from the root to no other node except itself) is called a leaf node.

New route information provided to a node in the link state packet can be classified as good news, bad news, or no impact to a node. Good news means that the node's path to the root becomes cheaper. Since it was already in the best place, there is no change to the path to this node. But its links need to be examined in case this results in a better path to one or more of its neighbors. Also, the nodes for which it is already the parent must be processed since they too will receive good news. The link state change results in bad news if the node's current path to the root becomes more expensive (including the case where it is no longer available at all). In this case there may be a better route via a different parent. This also applies to each node in its subtree, which must be scrapped and rebuilt. For each affected node, each link must be examined to see which gives the best route, via the link's neighbor considered as a potential parent. Nodes which have been "orphaned" as a result of receiving bad news (as well as nodes which were already unreachable) must be excluded as possible parents, otherwise loops will be created. If there is no change to the cost of the node's path, there is nothing else to be done.

It is normal in network design to allow traffic to be split across more than one path, if their total cost is the same. When this is allowed, there may be more than one path to the same node. In graph-theoretic terms, the spanning tree now becomes a directed graph. Considering the simple network of FIG. 9, and supposing that all links have the same cost, then node 74 could be reached from the root node 70 via any of nodes 72, 76 and 80. The present invention allows incremental route recalculation when equal cost path splitting is in use. In practice, the number of possible paths through the network is limited to some value (referred to as maxPathSplits) to reduce memory usage in the router.

This changes the good news and bad news information as follows. For the good news, if there are multiple parents, then all other parents (i.e., except the neighbor on the link bearing good news) are no longer relevant since they are no longer of equal cost. For the bad news, if there is more than one parent, then the bad news parent (i.e., neighbor on the link bearing bad news) is simply removed as a parent. Only when this is the sole parent (or sole remaining parent) does the subtree need to be scrapped as described above.

When the parents of a node change but not the distance from the root, further work is required. The purpose of the spanning tree is to determine the output adjacencies to use from the root when forwarding traffic to the node. The set of output adjacencies is calculated as the union of the output adjacencies for all of the parents, and pruned if necessary according to the maxPathSplits parameter. If this does not change with a change in the set of parents, then no further action is required. However, if the adjacencies do change then this calculation must be repeated for each subordinate node, and so on recursively. It can be stopped at any given node if the adjacency set does not change for this node (as may happen if other parents for this node replace those which were lost at the subtree root, for example).

The following is a description of one example of an algorithm that can be used to implement the present invention.

Each node in the network is represented by a data structure. There are a number of sets of nodes, with each node located in one set at a time. This is implemented by storing each set as a doubly-linked list, with the node structure containing the necessary pointer fields. The act of adding a node to one set implicitly removes it from whichever set it is currently in, or if it is already in the target set then does nothing. The following is a list of node identifiers:

Unreached: Nodes which have not yet been reached, or which are unreachable.

Paths: Nodes to which the minimum cost path has been found, and which are not awaiting some action in some other set.

Tent: Nodes to which a path has been found, which is not yet known to be minimum cost. These nodes are held in ascending order of cost.

Orphans: Nodes for which the minimum cost path is no longer valid, as a result of a link status update.

ParentsChanged: Nodes whose parents have changed, although at least one former minimum cost path is still valid. These nodes are held in ascending order of cost.

NewLSP: Nodes for which new Link State information has been received.

The following information is stored for each node:

currentLinks: Information about links to other nodes (i.e., the link state information). For each node to which there is a link (neighbor), two pieces of information are held: link cost to the neighbor and identity of the neighbor.

newLinks: New information received as a result of an update.

costToRoot: Cumulative cost of all links traversed from root to this node. For nodes in Paths and ParentsChanged, this is the definitive cost to the node. For nodes in Tent, it is the tentative cost by the best path found so far. For nodes in Orphans and Unreached, it is greater than any valid path cost (e.g., maxPathCost+1).

parents: Set of node references including all of the nodes having a link giving equal cost path to this node.

outputAdjacencies: Set of node references which are the nodes adjacent to root to which traffic for this node is to be forwarded. Each such node is the first along the set of equal cost paths corresponding to each member of parents. OutputAdjacencies for a node is the union of outputAdjacencies for each of its parents. This may be pruned to a maximum size (maxPathSplits) in which case the set should be held in some canonical order (for example, by order of increasing router address) so that the set of adjacencies used does not depend on the order in which updates are made.

Figure 3:
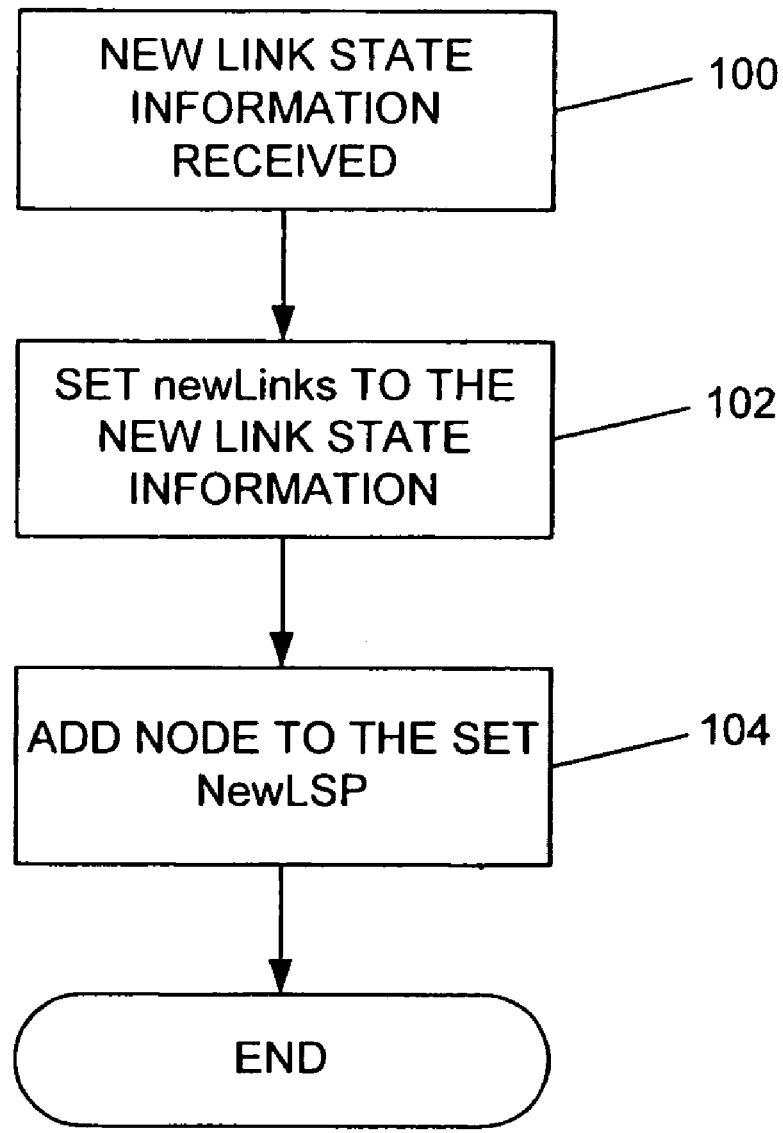
FIG. 3 is a flowchart illustrating a process for adding new link state information to a node.

When new Link State information is received for a node, a ReceiveLSP routine is invoked. This routine does not automatically trigger route recalculation, which requires a call to a RecalculateRoutes routine. The two may be invoked together, but they may also be invoked separately. For example, RecalculateRoutes may be allowed to run only at a maximum frequency, with a delay of the order of hundreds of milliseconds imposed to allow several updates to be processed at once. FIG. 3, is a flowchart illustrating steps for the ReceiveLSP process. New Link State information is first received at Step 100. At step 102, newLinks is set to the new Link State information. The node is then added to the set NewLSP at step 104.

Figure 4:
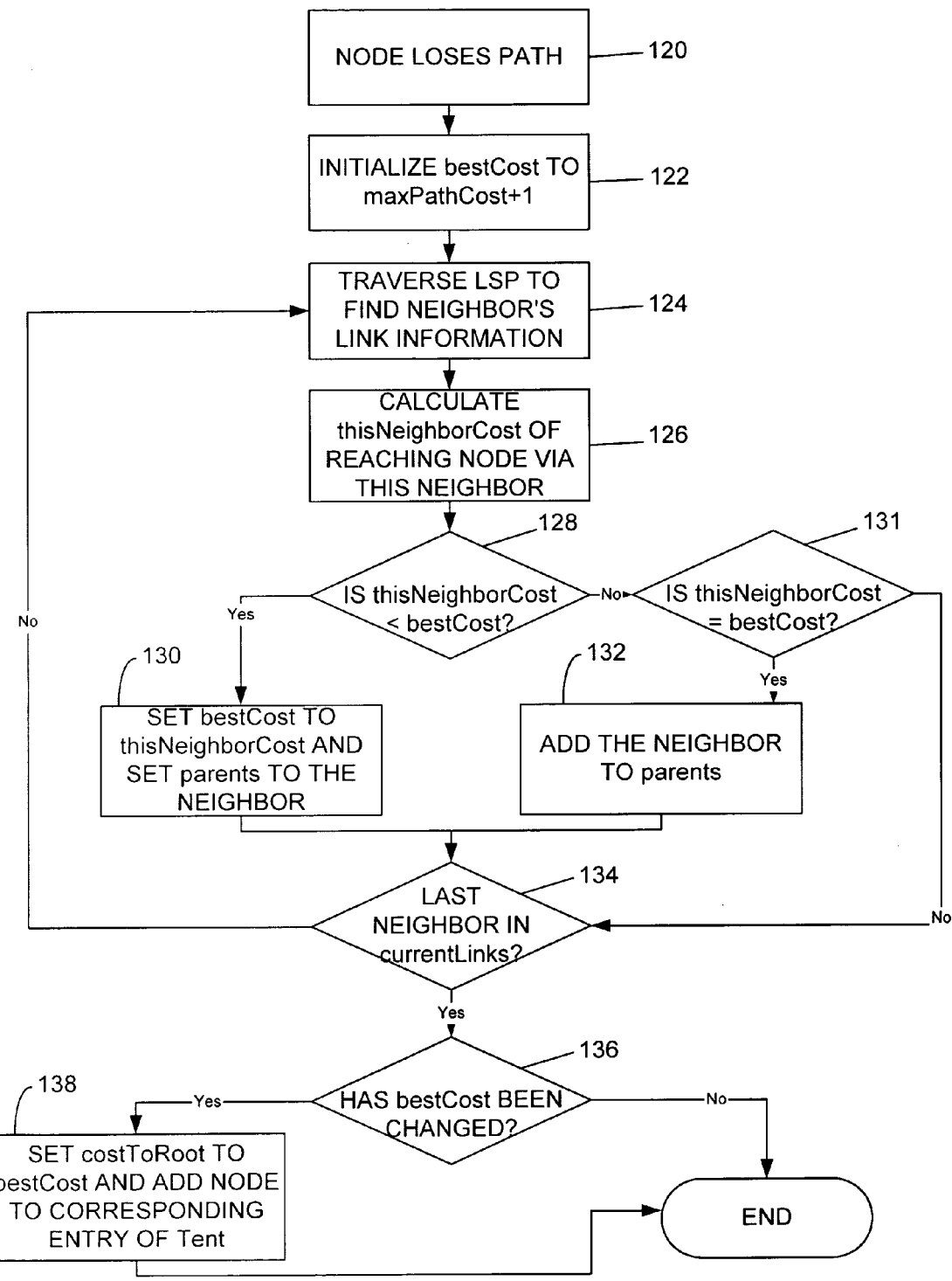
FIG. 4 is a flowchart illustrating a process for reattaching a node when it has lost its path.

A ReattachNode procedure is invoked when a node has lost its path to try and reattach it somewhere to the remaining spanning tree. In order to provide the same result as in the conventional algorithm, the link cost in the node's own LSP is ignored. The LSP contents are used to identify potential parents. In calculating the cost via a potential parent, the value used is the cost to the parent plus the cost to the present node contained in the parent's LSP, rather than the value in the node's own LSP. This is because links are allowed to have a different cost in each direction; the simpler approach of using the node's own cost would not necessarily give the same result as the full Dijkstra calculation. This technique also implicitly performs a two-way connectivity check, a required feature of Link State routing operation which ensures that a link is only used if it is available to the node at either end. Steps of the ReattachNode process are shown in the flowchart of FIG. 4. The process begins when a node loses its path at step 120. A bestCost is first initialized to maxPathCost+1 at step 122. Step 124 is next performed for each neighbor in the currentLinks. The neighbor's link information is found for the current node by traversing the LSP (step 124). The cost (thisNeighborCost) is calculated of the reaching node via this neighbor as the neighbor's costToRoot plus the cost of the link from the neighbor (step 126). If this NeighborCost is less than bestCost then bestCost is set to the thisNeighborCost and the parents are set to the neighbor, removing all current members (steps 128 and 130). If the calculated cost is not less than bestCost but is equal to it the neighbor is added to parents (steps 128, 131, and 132). Steps 124–134 are repeated for each neighbor. If bestCost has been changed, costToRoot is set to bestCost and the node is added to the corresponding entry of Tent (steps 136 and 138).

Figure 5:
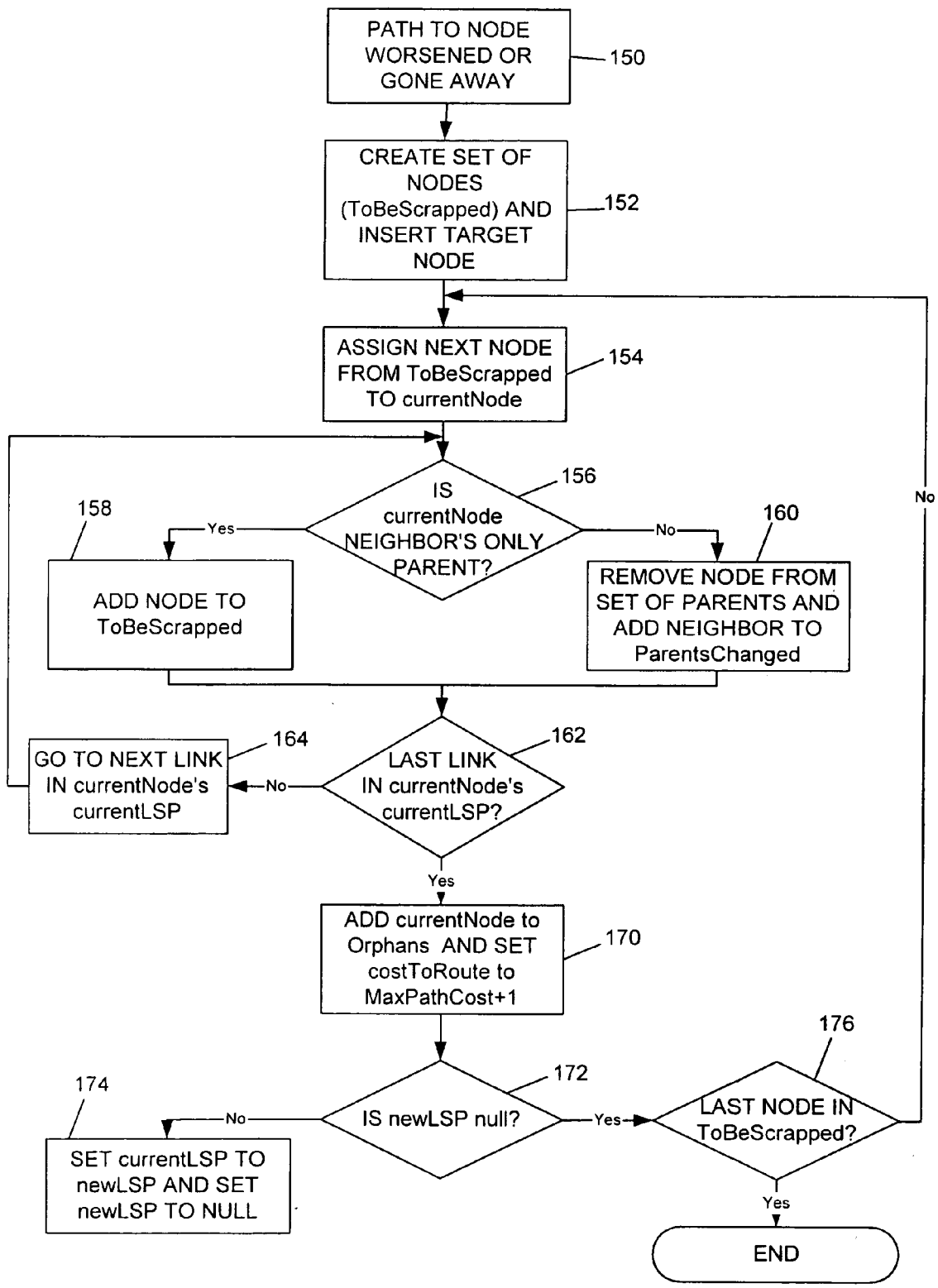
FIG. 5 is a flowchart illustrating a process for recalculating routes in nodes of a subtree when a path to a root has worsened or gone away.

A ScrapSubtree procedure is invoked when the path to a node has become worse or gone away completely to force recalculation of routes to all of the nodes in the subtree of which it is the root. The effect is to place all nodes in the subtree into either Orphans (if all of their parents are in the subtree being scrapped) or ParentsChanged (if only some of their parents are in the subtree being scrapped). FIG. 5 is a flowchart illustrating the ScrapSubtree procedure. After a path to the node has worsened or gone away (step 150), a local set of nodes ToBeScrapped created and the target node is inserted at step 152. The currentNode is then set to the first node from ToBeScrapped (step 154). Next it is determined if currentNode is the neighbor's only parent for each link in currentNode's current LSP (step 156). If it is, the node is added to ToBeScrapped (step 158). If currentNode is one of the parents and there are still others, it is removed from the set of parents and the neighbor is added to ParentsChanged in the appropriate position (according to costToRoot) (step 160). Steps 156–164 are repeated for each link in currentNode's currentLSP. At step 170 currentNode is added to Orphans and costToRoute is set to maxPathCost+1. If the node has an outstanding new LSP (i.e., newLSP is not null) then it is made the currentLSP (i.e., set currentLSP to newLSP and set newLSP to null (steps 172 and 174). This is not required if only a single node is dealt with at a time by RecalculateRoutes as it happens only when a node with a new LSP is also part of the subtree of another node which has received bad news. Steps 154–176 are repeated while there are still nodes in ToBeScrapped.

A recalculateRoutes procedure is invoked to perform an incremental route recalculation for all nodes which have received new link state information. Changes for more than one node can be processed at the same time, as long as nodes are dealt with in increasing order of distance from the root. This ensures correct treatment for a node which has a change in its own link state information, and which is also in the subtree of a node closer to the root whose information has changed. It is important that the correct link state information is used at each step. As described below, some steps require the old Link State information (i.e., those dealing with the current structure of the spanning tree) while those concerned with building the new tree must use the new Link State information.

Figure 6:
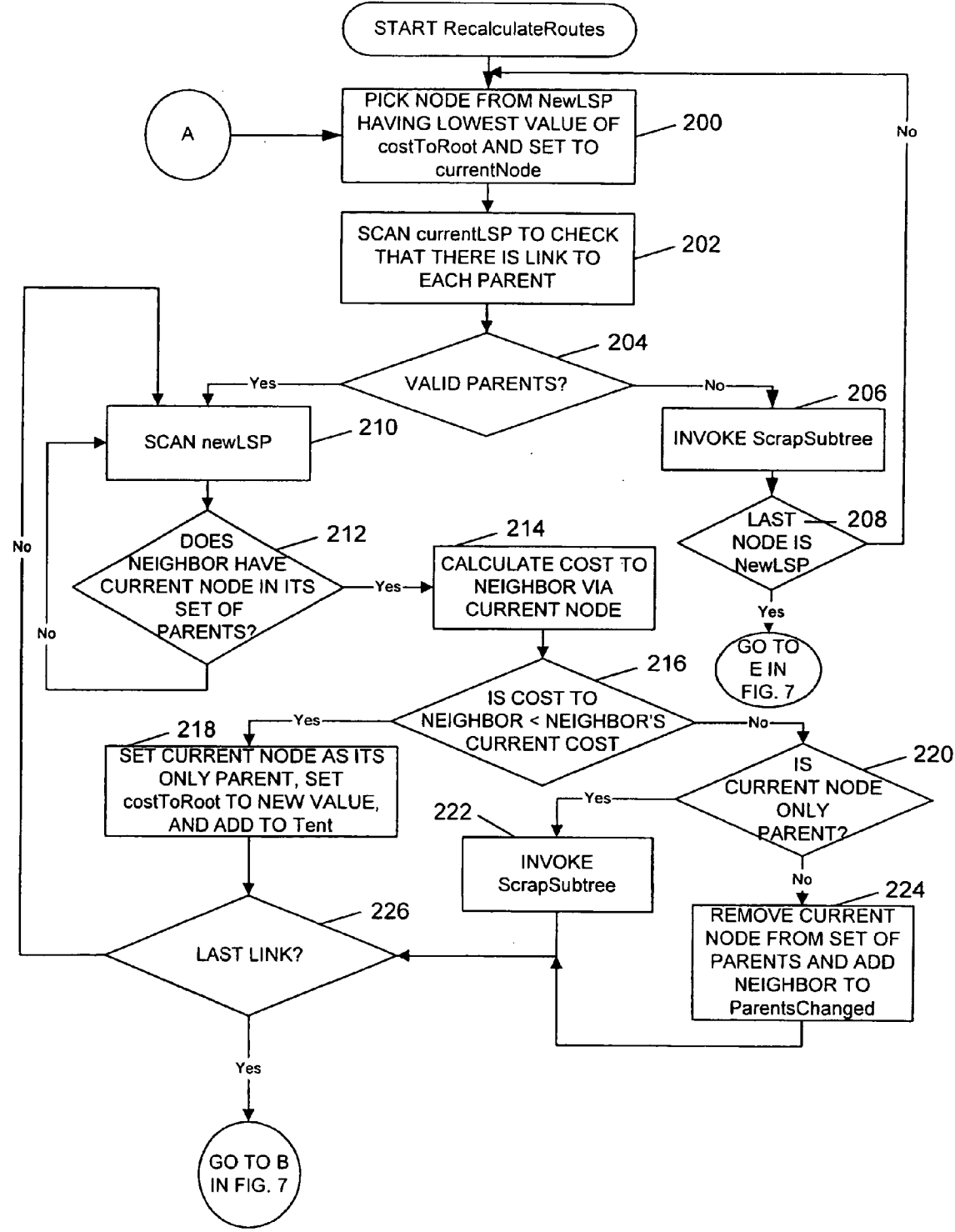
FIGS. 6–8 are flowcharts illustrating a process for performing an incremental route recalculation.
Figure 7:
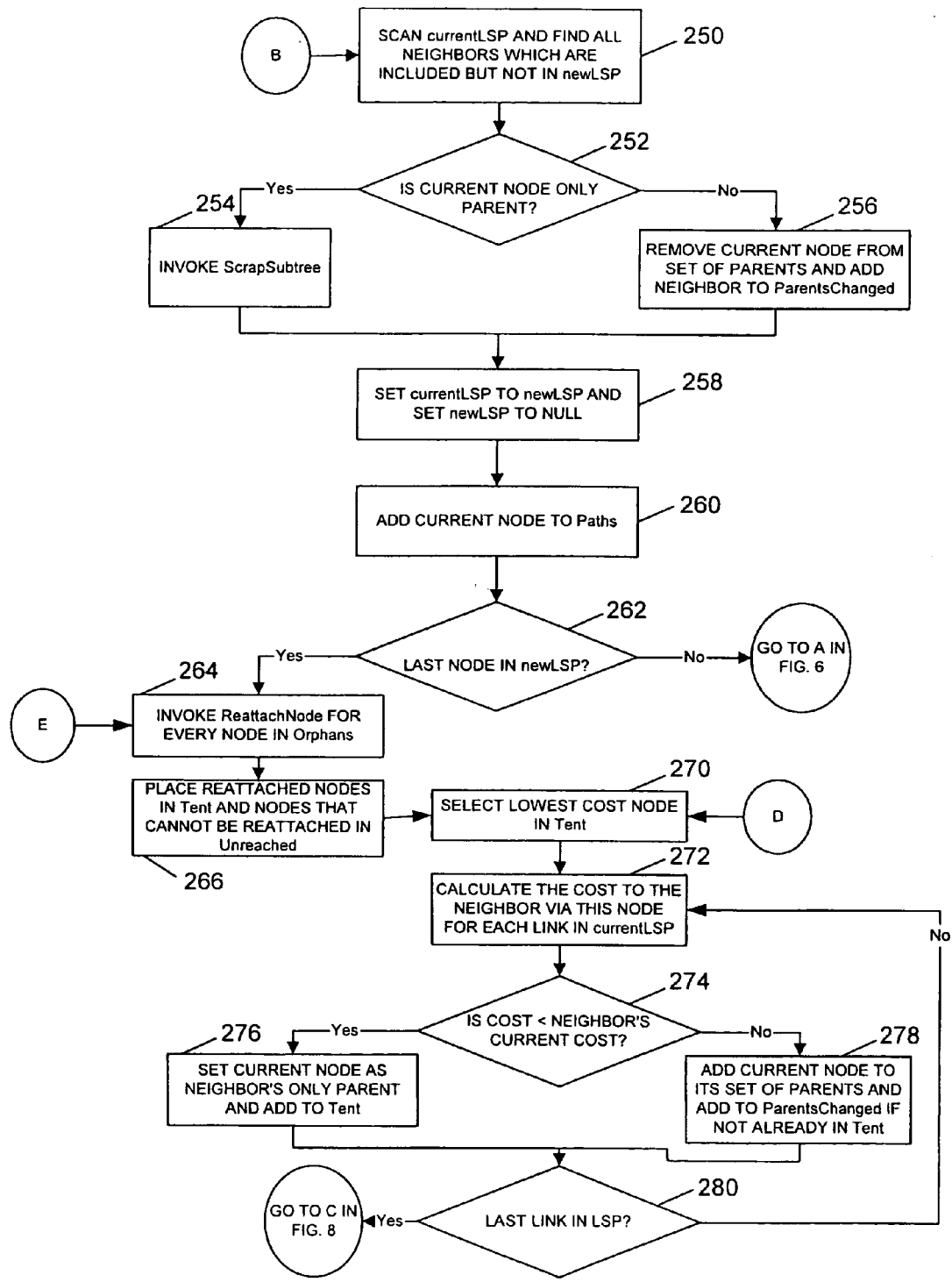
Figure 8:
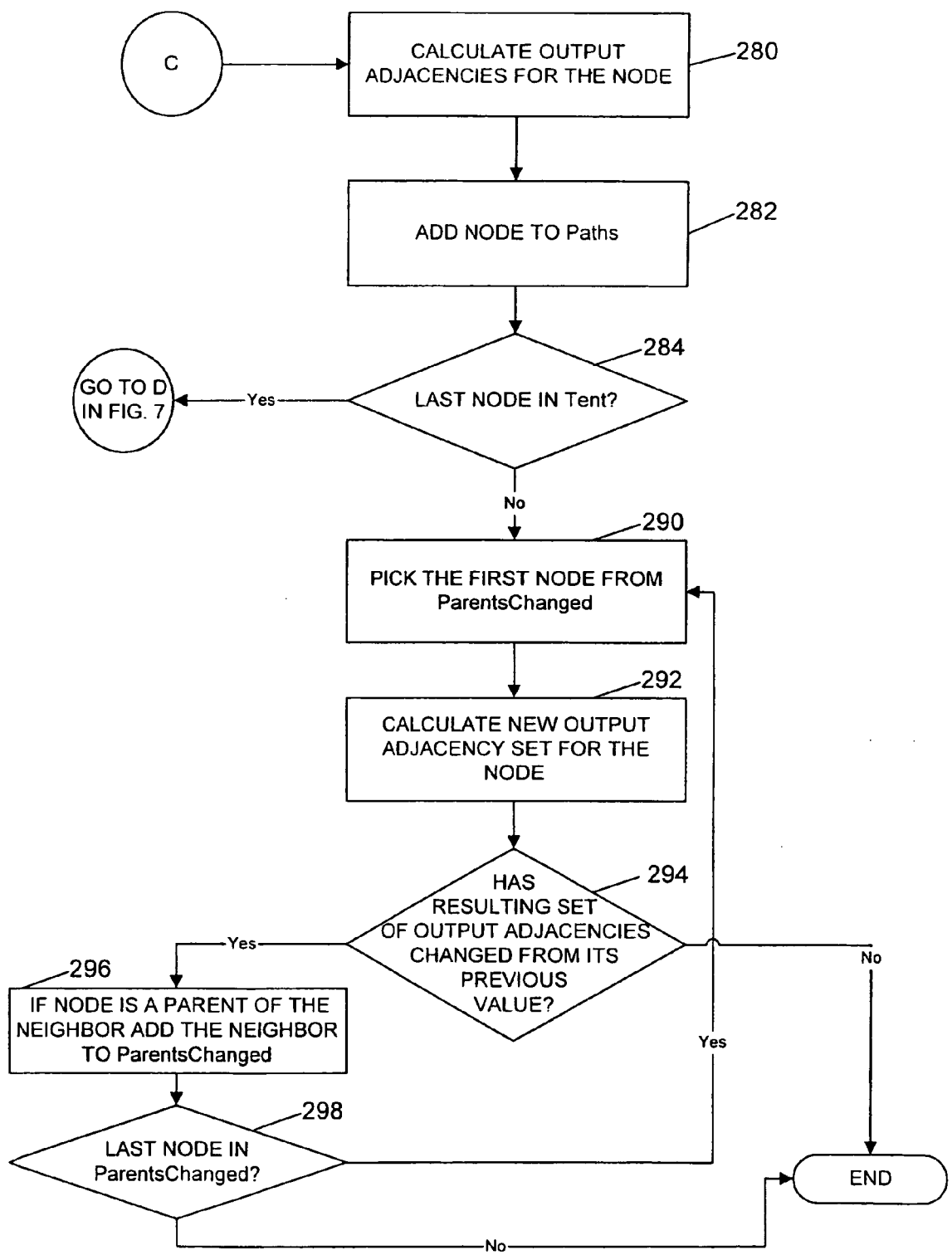

FIGS. 6–8 illustrate a process for recalculating routes. The node which currently has the lowest value of costToRoot is picked from NewLSP and set as currentNode at step 200. It is next determined whether the existing route to this node is still valid. The currentLSP is scanned and checked that there is still a link to each parent (steps 202 and 204). The cost of the link is that of the parent, which either has not changed or has been dealt with by now. Thus, the link cost in this node's LSP is irrelevant. If there are no longer any valid parents, ScrapSubtree is invoked for this node (step 206). If there are any nodes remaining in NewLSP, the process returns to step 200 (step 208). If there are no nodes remaining, ReattachNode is invoked (see step 264 of FIG. 7). If there are still valid parents, the newLSP is scanned (steps 204 and 210). If the neighbor on the link does not have the current node in its set of parents, the process returns to step 210 to deal with the next link (step 212). If the neighbor has current node in its set of parents, the cost to the neighbor is calculated via the current node (i.e., costToRoot plus the link cost) at step 214. If the cost to the neighbor is less than the neighbor's current cost (costToRoot) then the neighbor has good news and the current node is set as its only parent, its costToRoot is set to the new value, and it is added to Tent at the appropriate position (steps 216 and 218). If the cost to the neighbor is greater than the neighbor's current cost and the current node is the only parent (steps 216 and 220), the neighbor has bad news and ScrapSubtree is invoked (step 222). If the cost to the neighbor is greater than the neighbor's current cost and there is more than one parent (steps 216 and 220), the current node is removed from the set of parents and the neighbor is added to ParentsChanged at the appropriate position (step 224). Steps 210–226 are then performed for the next link.

Links which have gone away completely are next dealt with in FIG. 7. The currentLSP is scanned to look for all neighbors that are included in current LSP but not in newLSP (step 250). This is necessary because an LSP will explicitly report an increase in cost, but will not report a link that is no longer in service (i.e. whose cost has effectively become infinite). For each such entry found steps 252–256 are performed, exactly as if explicit bad news had been received. If the current node is the only parent, ScrapSubtree is invoked for the neighbor (steps 252 and 254). If the current node is not the only parent, the current node is removed from the set of parents and the neighbor is added to ParentsChanged at the appropriate position (steps 252 and 256). The node's new LSP is made the current LSP by setting currentLSP to newLSP and setting newLSP to null (step 258). The current node is then added to Paths at step 260. The process returns to step 200 (FIG. 6) if there are any nodes remaining in NewLSP (step 262).

If there are no nodes remaining in new LSP, ReattachNode is then invoked for every node in Orphans (step 264). This may succeed in reattaching some, all, or none of the nodes, depending on the other links that they have. Those which are reattached are placed in Tent and nodes which cannot be reattached are placed in Unreached (step 266).

The Dijkstra algorithm is then run for each node which is now in Tent. The first node from Tent (i.e., one with lowest cost) is selected (step 270) and steps 272–278 are performed. For each link in currentLSP the cost to the neighbor via this node is calculated (i.e., costToRoot plus the link cost) (step 272). If this cost is less than the neighbor's current cost (including the case where the neighbor is not yet reachable), the current node is set as the neighbor's only parent, its costToRoot is set, and it is added to Tent in the appropriate position (steps 274 and 276). If this cost is equal to the neighbor's current cost, the current node is added to its set of parents, the neighbor is added to ParentsChanged at the appropriate position if not already in Tent (steps 274 and 278). Steps 272–280 are repeated for each remaining link in the LSP.

The output adjacencies are then calculated for the node (i.e., the union of the output adjacencies of all parents) and trimmed if necessary according to maxPathSplits (step 300) (FIG. 8). The node is then added to Paths at step 282. If there are still nodes in Tent, steps 270–282 are repeated (step 284). The nodes whose parents have changed are next dealt with. The first node from ParentsChanged is selected (step 290). The new output adjacency is calculated and set for the node (step 292). If the resulting set of output adjacencies has changed from its previous value, then for each neighbor in the LSP, if this node is a parent of the neighbor, the neighbor is added to ParentsChanged at the appropriate position (steps 294–296). The process returns to step 290 if there are any nodes left in ParentsChanged (step 298).

As can be observed from the foregoing, the method and system of the present invention provide a reduction in the cost of processing an update over conventional link state protocol methods. For the conventional implementation of the Dijkstra algorithm, every node in the network has to be examined for every change. With the present invention, the number of nodes to be examined is proportional to the network diameter (i.e., the log of the number of nodes) and is typically less than five on average. Even in the worst case (e.g., change in state of a link directly attached to the node under consideration) the computation required is a fraction of the conventional implementation.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for performing route calculations in a link state routing protocol at a node within a computer network, the method comprising:

receiving new route information at the node;

evaluating existing routes of the node before recalculating and modifying routes to determine if said new route information improves at least one of the existing routes or at least one of the existing routes is made worse or lost;

recalculating routes and modifying a routing table for the node only when said new route information improves at least one of the existing routes or at least one of the existing routes is made worse or lost, wherein recalculating routes comprises modifying information about links within the network without examining each of the nodes within the network; and upon losing one of the existing routes:

initializing a best cost;

finding a neighbor node's link information by traversing a link state packet;

calculating a neighbor cost of reaching another node via the neighbor node; and setting the best cost to the neighbor cost if the neighbor cost is less than the best cost;

wherein only a parent node sending the new route information is used in recalculating routes if the new route information improves existing routes.

2. The method of claim 1 further comprising receiving a new link state packet with information about the node's path to a root node and wherein the node's route to the root node is improved and further comprising evaluating the node's neighbor nodes.

3. The method of claim 1 further comprising receiving a new link state packet with information about the node's path to a root node and wherein the node's route to the root node has worsened and further comprising evaluating the node's path to the root node.

4. The method of claim 3 wherein nodes contained within a subtree containing the node are scrapped and the routes to all nodes in the subtree are re-evaluated.

5. The method of claim 1 wherein recalculating existing routes comprises implementing equal-cost path splitting.

6. The method of claim 5 wherein the new route information improves existing routes and only a parent node sending the new route information is used in recalculating routes.

7. A method for performing route calculations in a link state routing protocol at a node within a computer network, the method comprising:
receiving new route information at the node;
evaluating existing routes of the node before recalculating and modifying routes to determine if said new route information improves at least one of the existing routes or at least one of the existing routes is made worse or lost;
recalculating routes and modifying a routing table for the node only when said new route information improves at least one of the existing routes or at least one of the existing routes is made worse or lost, wherein recalculating routes comprises modifying information about links within the network without examining each of the nodes within the network; and
upon losing one of the existing routes:
initializing a best cost;
finding a neighbor node's link information by traversing a link state packet;
calculating a neighbor cost of reaching another node via the neighbor node; and
setting the best cost to the neighbor cost if the neighbor cost is less than the best cost;
wherein a parent node sending the information is no longer considered a parent node by said node if the new route information worsens existing routes.

8. The method of claim 1 wherein the computer network comprises greater than one hundred nodes.

9. The method of claim 1 wherein said node has lost its path to a different node within the computer network.

10. The method of claim 9 further comprising reattaching the node at a location within a remaining portion of a spanning tree.

11. The method of claim 1 further comprising recalculating routes to all other nodes in a subtree of which the node is a root node.

12. The method of claim 1 further comprising performing an incremental route recalculation for all nodes within the network that have received new link state information.

13. A computer program product for performing route calculations in a link state routing protocol at a node within a computer network, comprising:
code that evaluates existing routes of the node before recalculating and modifying routes to determine if said new route information improves at least one of the existing routes or at least one of the existing routes is made worse or lost;
code that recalculates routes and modifies a routing table for said node only when said new route information improves at least one of the existing routes or at least one of the existing routes is made worse or lost, wherein said code that recalculates routes comprises code that modifies information about links within the network without examining each of the nodes within the network;
code that, upon losing one of the existing routes:
initializes a best cost;
finds a neighbor node's link information by traversing a link state packet;
calculates a neighbor cost of reaching another node via the neighbor node; and
sets the best cost to the neighbor cost if the neighbor cost is less than the best cost; and
a computer-readable storage medium for storing the codes;
wherein only a parent node sending the new route information is used in recalculating routes if the new route information improves existing routes.

14. The computer program product of claim 13 wherein the computer-readable medium is selected from the group consisting of CD-ROM, floppy disk, flash memory, system memory, hard drive, and data signal embodied in a carrier wave.

15. The computer program product of claim 13 further comprising code that performs equal-cost path splitting.

16. A system for performing route calculations in a link state routing protocol at a node within a computer network, the system comprising a processor operable to evaluate existing routes of the node before recalculating and modifying routes to determine if said new route information improves at least one of the existing routes or at least one of the existing routes is made worse or lost, recalculate routes and modify a routing table for said node only when said new route information improves existing routes or existing routes are made worse or lost, and upon losing one of the existing routes initializes a best cost, finds a neighbor node's link information by traversing a link state packet, calculates a neighbor cost of reaching another node via the neighbor node, and sets the best cost to the neighbor cost if the neighbor cost is less than the best cost; wherein recalculating routes comprises modifying information about links within the network without examining each of the nodes within the network and wherein only a parent node sending the new route information is used in recalculating routes if the new route information improves existing routes; and memory for storing route information.

17. A system for performing route calculations in a link state routing protocol at a node within a computer network, comprising:
means for evaluating existing routes of the node before recalculating and modifying routes to determine if said new route information improves at least one of the existing routes or at least one of the existing routes is made worse or lost;
means for recalculating routes and modifying a routing table for said node only when said new route information improves existing routes or existing routes are made worse or lost, wherein means for recalculating routes comprises modifying information about links within the network without examining each of the nodes within the network;

means for initializing a best cost when one of the existing routes is lost;

means for finding a neighbor node's link information by traversing a link state packet;

means for calculating a neighbor cost of reaching another node via the neighbor node;

means for setting the best cost to the neighbor cost if the neighbor cost is less than the best cost; and memory for storing route information;

wherein only a parent node sending the new route information is used in recalculating routes if the new route information improves existing routes.

18. The system of claim 17 further comprising means for performing equal-cost path splitting.

19. A method for performing route calculations in a link state routing protocol at a root node within a computer network, the method comprising:

receiving new route information at the root node;

sorting nodes with new route information into order of cost;

evaluating changes in state;

evaluating routes before reattaching routes, if existing routes are improved, lost, or made worse;

reattaching routes at lowest cost point in a spanning tree; and re-evaluating routes from reattached nodes; and upon losing one of the existing routes:

initializing a best cost;

finding a neighbor node's link information by traversing a link state packet;

calculating a neighbor cost of reaching a node via the neighbor node; and setting the best cost to the neighbor cost if the neighbor cost is less than the best cost;

wherein only a parent node sending the new route information is used in evaluating the routes if the existing routes are improved.

20. The method of claim 19 further comprising splitting traffic across more than one path if total cost is the same for each of the paths.

21. The method of claim 20 wherein evaluating changes in state comprises performing incremental route recalculation.

22. The method of claim 19 wherein sorting nodes comprises sorting nodes into order of cost from the root node.

23. The method of claim 19 further comprising leaving routes unchanged if the new route information has no effect on existing routes.

24. The method of claim 19 wherein existing routes are lost or made worse and further comprising re-evaluating a subtree of the root node.

25. The method of claim 24 further comprising splitting paths among equal cost routes.

26. The method of claim 1 wherein each node within the computer network is represented by a data structure comprising information about links to other nodes and cumulative cost of all links traversed from a root to the node.

27. The method of claim 1 wherein recalculating routes from the node comprises applying an incremental Dijkstra's algorithm to the node.

28. The method of claim 1 wherein said at least one of the existing routes is made worse and further comprising recalculating routes to all nodes in a subtree of the node.

29. The method of claim 1 wherein recalculating routes comprises recalculating routes at all nodes which have received new link state information and processing said nodes in increasing order of distance from a root node.

30. The method of claim 1 further comprising applying an incremental Dijkstra's algorithm to the root node only if said new route information improves or worsens at least one of the existing routes or at least one of the existing routes is lost.

31. The method of claim 30 further comprising applying equal-cost path splitting.

32. The method of claim 30 wherein the number of nodes examined is proportional to the log of the number of nodes within the network.

* * * * *